Figure 1:
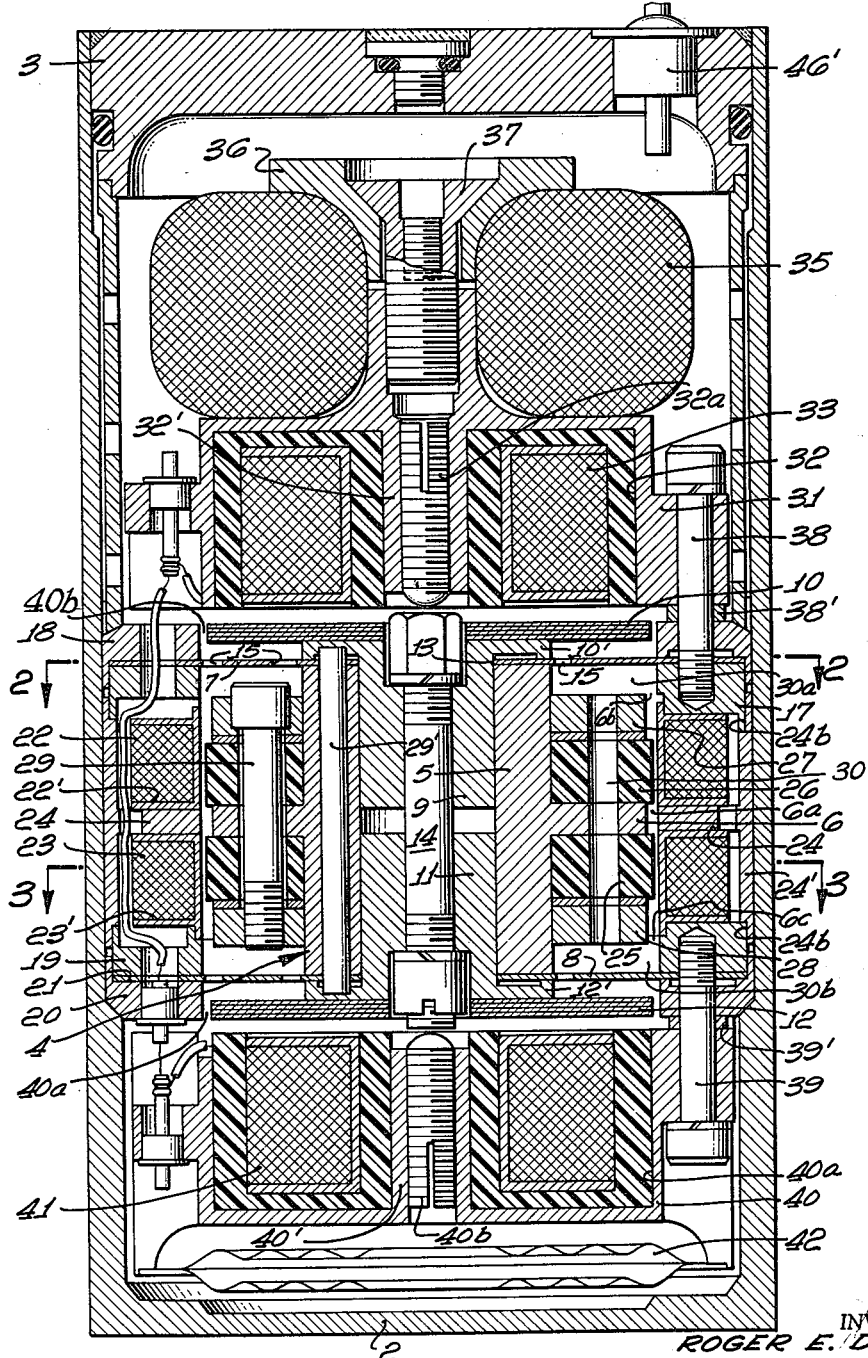

INVENTORS.
ROGER E. DUMAS
ARTHUR C. HUGHES, JR.
BY

ATTORNEY.

INVENTORS
ROGER E. DUMAS
ARTHUR C. HUGHES, JR.
BY

ATTORNEY.

INVENTORS.
ROGER E. DUMAS
ARTHUR C. HUGHES, JR.
BY

ATTORNEY.

United States Patent Office 3,076,343
Patented Feb. 5, 1963

3,076,343
ELECTROMAGNETIC TRANSDUCERS
Roger E. Dumas, Pacific Palisades, and Arthur C. Hughes, Santa Monica, Calif., assignors to Statham Instruments, Inc., Los Angeles, Calif., a corporation of California
Filed Feb. 5, 1960, Ser. No. 6,945
12 Claims. (Cl. 73—517)

This invention relates to an electromagnetic transducer in which an element is mounted for displacement in response to a condition to be sensed and the displacement is sensed by a sensing element. Where the condition to be sensed is acceleration, the displacement of the mass of the element is the measure of the acceleration. Where the condition is pressure, the displacement is a measure of the pressure under which the element is moved. Other conditions to be sensed are also determinable by such transducers on proper organization of the element and other environmental conditions, as will be well understood by those skilled in the art.

In all such systems it is necessary to calibrate the transducer in order to know the relationship between the force or other conditions to be sensed and the displacement of the element at various levels of force or other condition. It is conventional in such transducers to mount them in test systems in order to obtain such calibration. Once introduced into a system where they are to give the required intelligence, the original calibration must be relied upon or the unit must be removed for recalibration.

We have devised an electro-magnetic transducer which may be calibrated electrically without subjecting the transducer to test which simulates the operation of the transducer in its use. The transducer of our invention may be calibrated after installation into the system where it is to be used to give the required intelligence and without subjecting the transducer to the operation of the system. Thus, in the transducer of our invention we may periodically subject the transducer to recalibration without removal of the transducer from the system from which it is mounted. In the transducer of our invention, we mount the element whose displacement is to be sensed as a measure of the condition transduced, so that the element is or may be connected to an armature of a solenoid. The solenoid may be and is preferably independent of the means which senses the displacement of the element as a measure of the condition to be sensed by the transducer. We may thus, by passing a known current through solenoid coils, cause the armature and therefore the element to be displaced either by a known amount and by a known force, and thus we may calibrate the transducer by simulating electro-magnetically the application of the condition to be sensed at various levels the force or displacement resulting from such condition.

When for purposes of sensing the condition to be transduced, the mass, as in an accelerometer, is spring mounted, the restoring force of the spring may be the restoring force of the solenoid. However, the solenoid may be used to create a restoring force to restore the system to zero by appropriate polarization of the solenoid.

Where the transducer employs electro-magnetic sensing elements, we design the electro-magnet element of the solenoid so that it does not deleteriously affect the magnetic circuit of the electro-magnetic sensing element. We thus may provide that the electro-magnetic sensing element performs in a linear manner to give a read out which is linear with applied displacement or force as the case may be.

The above solenoid may thus be termed a force coil system.

The force coil may also be employed to introduce a controlled electro-magnetic damping force to control the dynamic response of the system. This may be in addition to any other damping such as viscous or acoustic damping which may also be employed.

Figure 2:
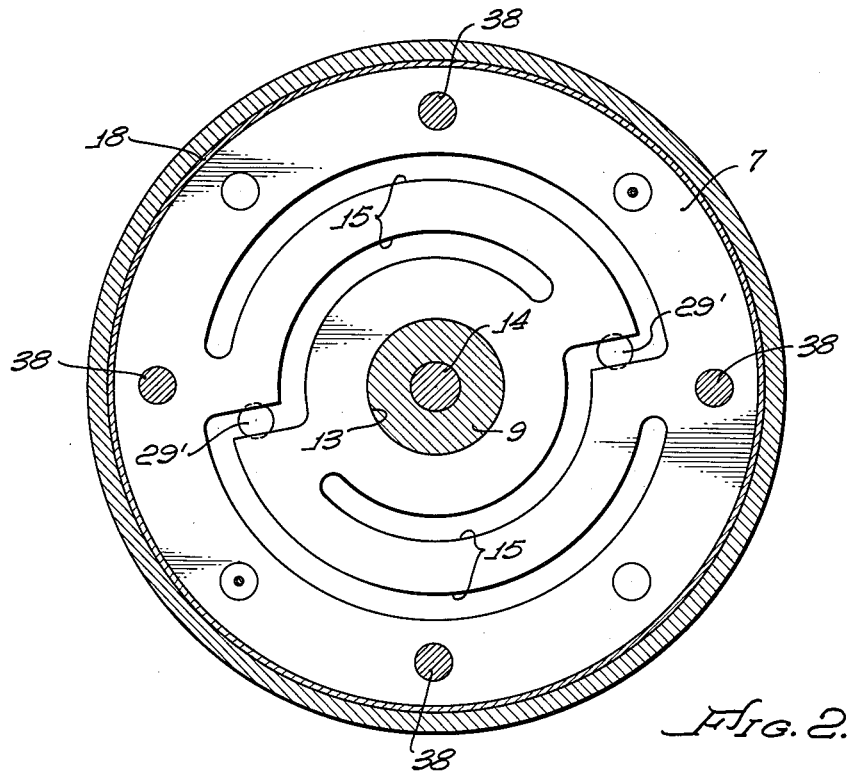
Figure 6:
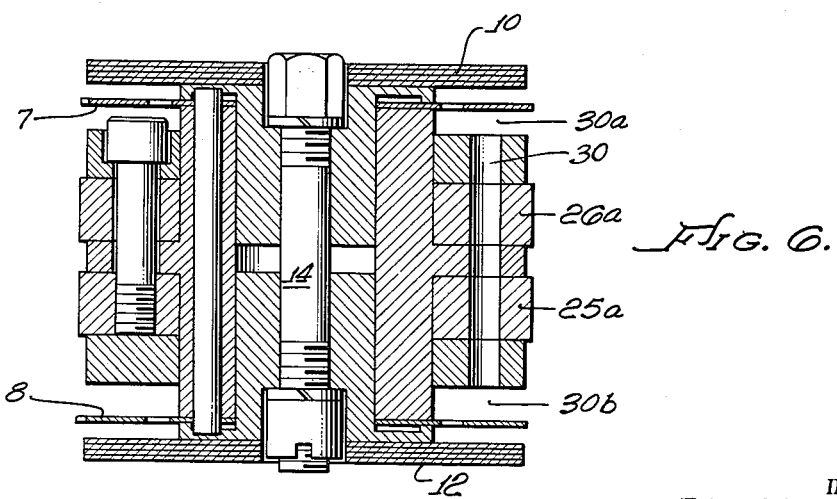
Figure 3:
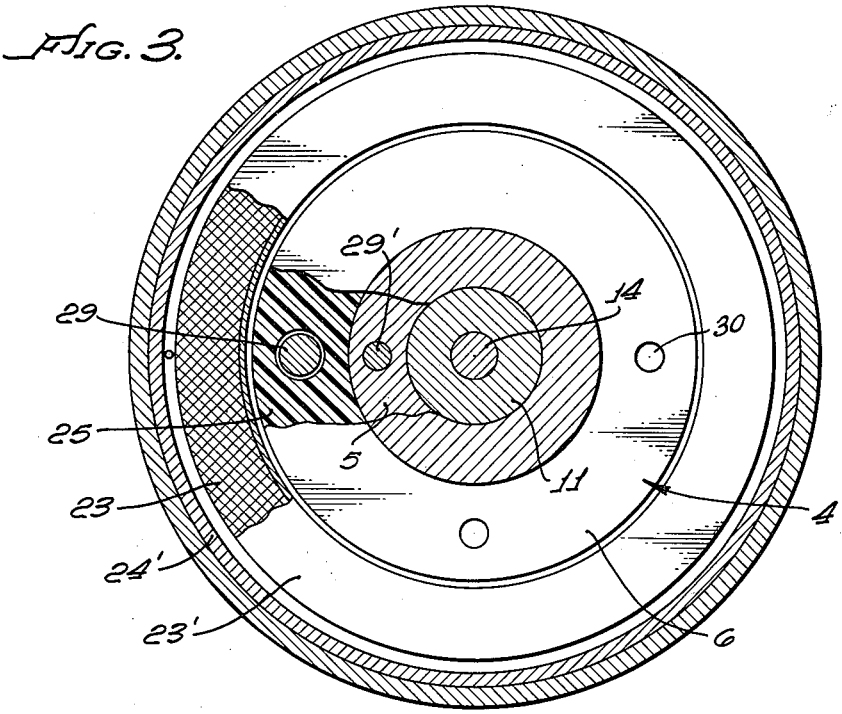
Figure 4:
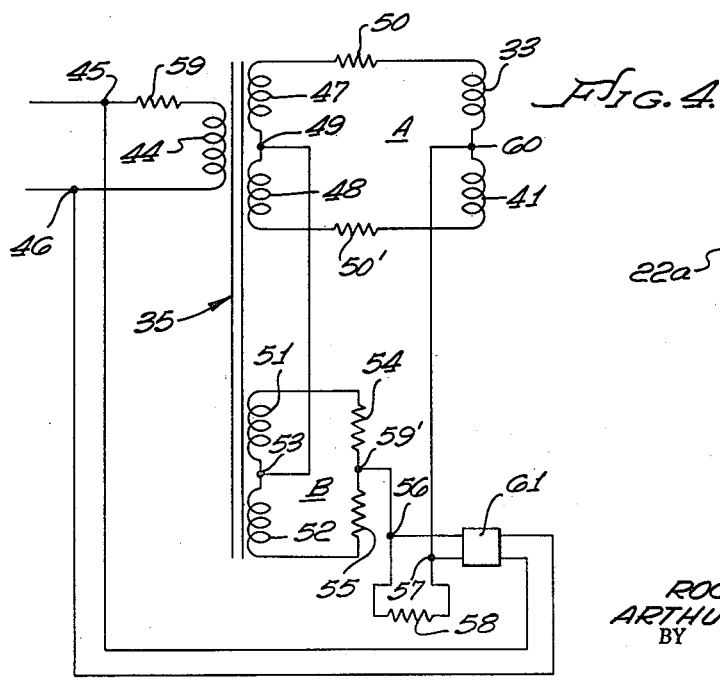
Figure 5:
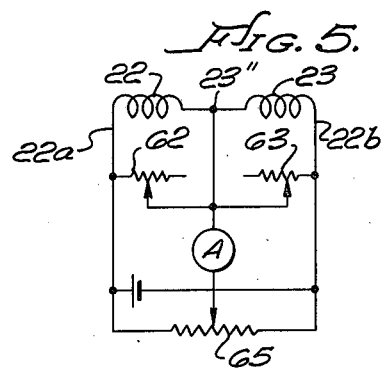

As is well known, the frequency response characteristics of a seismic mass, i.e., a spring suspended mass, which undergoes damped oscillatory movement, is a function of the damping ratio. The value of the damping ratio may be controlled in the system of our invention by introducing eddy current damping in the armature of the solenoid. The above observation of our invention will be further described in connection with the drawing in which:

FIG. 1 is a vertical section through a transducer employing a preferred form of our invention;
FIG. 2 is a section on line 2—2 of FIG. 1;
FIG. 3 on line 3—3 of FIG. 1;
FIG. 4 is a schematic circuit diagram of the electromagnet sensing element;
FIG. 5 is a schematic circuit diagram of the force coil system; and
FIG. 6 is a modification of the mass assembly employed in FIGS. 1–5.

The transducer illustrated in FIG. 1 consists of a casing having a bottom 2 and a cover 3. The mass assembly 4 is formed of an armature plate 10 positioned on a grooved flange 10' which is carried in the internal bore of sleeve 5 in which the stem 9 is positioned. The flat spring 7 carrying arcuate slots 15 and a central bore 13 is clamped between the flange 10' and an end of the sleeve 5. Central flange 6 on sleeve 5 carries the rings 27, 26, 25 and 28 by means of cap screw 29. The lower end of the sleeve 5 carries a stem 11 with a grooved flange 12', similar to 9 and 10'. The orientation of the stems 9 and 11 and sleeve 5 is fixed by locating pin 29' which passes through bores in the stem 5, springs 7 and 8 and seats in receiving sockets in the flanges 10' and 12'. The spring 8 of construction similar to spring 7 is clamped between the end of 5 and the flange 12'.

The laminated armature 10 is carried on the flange 10' on stem 9, and the laminated armature 12 is carried on the flange 12' of stem 11. The circular plate armatures 10 and 12 are composed of laminated sheets of metal, each of which is surface oxidized and formed of metal of high magnetic permeability and of laminated construction and metal similar to that used in transformer cores. The metal of 5, 6 and rings 28 and 27 is of high magnetic permeability and low coersive force. The flange 10', stem 9, spring 7, bolt 14, stem 11, flange 12' and spring 8 are of low magnetic permeability. The rings 25 and 26 are made of plastic, e.g., polytetrafluoroethylene, sold by Du Pont de Nemours under the trademark Teflon, or poly monochlorodifluoroethylene sold under the trademark Kel-F, or any other moldable or machinable organic plastic material having a substantially different temperature coefficient of expansion.

The mass assembly is held in position by the bolt 14 through suitably provided bores in 9 and 11. A bore 30 may be provided through the rings 27, 26, 25 and 28 and the flange 6, holes being in registry to give a continuous passageway from the space 30a to 30b. This is desirable in order to introduce additional dynamic mass into the system if the system is filled with damping liquid as will be more fully described below.

The spring 8 is clamped at its outer edges between the ring 20, seated on the internal shoulder 21 and the ring 19 by means of the cap screws 39. The receiver 40 is formed with an annular groove 40a and a central boss 40′, carrying a screw 40b which acts as a stop for the mass 4. The electro-magnet coil 41 held in a receiver 40 is mounted on the ring 20 by means of spacers 39′ and the cap screws 39 which are threaded into the ring 19. There are a plurality of these cap screws spaced about the periphery of the unit.

The spring 7 is clamped between the ring 17 and the ring 18 by means of cap screws 38. The electro-magnet coil 33 is mounted in the receiver 31 which is mounted on ring 18 by spacers 38′ and held secure by cap screws 38 which are threaded into the ring 17. There are a plurality of said screws positioned around the periphery of the unit.

24 is a flange integral with the sleeve 24′, in which the rings 17 and 19 are inserted. The sleeve 24′ has step 24b to maintain spacing between rings 17 and 19.

The sleeve 24′, concentric with the sleeve 5 and flange 6 and spaced therefrom to provide an annulus, is clamped between the rings 19 and 17. The receiver 31 has an annular slot 32 and a central boss 32′. The coil 33 is set in the annular slot 32. The central boss 32′ carries a screw 32a which acts as a stop for the mass 4. The armature 10′ is spaced from the core 32′ of the coil 33 and from the outer peripheral wall of the annular gap 40b between the edge of 10 and ring 18, and the armature 12 is spaced from the core 40′ and the outer peripheral wall of the annular gap 40a between the edge of 12 and the ring 20 by an air gap which is equal to the air gap for coil 33 when the mass 4 is positioned centrally between the two coils. The magnetic circuit for each of the coils is around the receiver through the core and the outer peripheral wall of the annular groove across the gap and across the armature. A variation in position of the mass will increase the length of the gap for one coil and decrease it for the other, depending upon the direction of motion. This variation in the length of the gap will affect the inductance of each of the coils essentially equally for motions that are a small part of the air gap, of under about ⅓ of the gap length, and in opposite directions.

The insulated solenoid force coils 22 and 23 are positioned in circular channels 22′ and 23′ surrounding the mass 4 and clamped between the rings 17 and 19 and spaced apart by the flange 24 on the mounting sleeve 24′. The flange has a number of spaced bores 24a for passage of wiring. The spring clamping rings 18, 20 and ring channels 22′ and 23′ are of low permeability, i.e., of high reluctance material. For example, a reluctance equal to air and of high electrical resistivity to inhibit eddy currents. The ring flange 24 and sleeve 24′, 17 and 19 are of high magnetic permeability, i.e., low reluctance and low coercive force.

The force coils 22 and 23, positioned in the annulus between 5 and 24′, are connected in series as shown in FIG. 5 to terminals 22a and 22b and with a center tap terminal 23″. Each of these terminals is connected by conductors to the terminal connectors 46′, of which only one is shown in FIG. 1. Carried on the receiver 31 is a toroidal coil transformer 35 held by clamp 36 by means of studs 37.

Positioned at the bottom of the transducer and held in position by the receiver 40 is a bellows 42 which is filled and sealed with ambient air at atmospheric pressure.

The transformer 35 is composed of an insulated primary 44 connected to a series resistance 59 and to the input terminals 45 and 46. One set of insulated secondary windings 47 and 48 is connected in series with a center tap 49, and a second set of secondaries is positioned in 35, composed of secondary coils 51 and 52 connected in series with a center tap 53 between coils 51 and 52 and cross connected to the center tap 49. Resistances 54 and 55 are connected in bridge arrangement (B) with the secondaries 52 and 53, and a resistance 50 is connected in series with the coil 47. Coils 33 and 41 are connected in a bridge A with secondary windings 47 and 48 through the resistances 50 and 50′; and the center tap 59, between resistances 54 and 55, is connected to the terminal 56 and the center tap 60 between coils 33 and 34 connected to the terminals 57. The coils 44, 47, 48, 51 and 52 are positioned at 35. The resistances are positioned about the periphery of the housing 31. The input terminals 45 and 46 and the output terminals 56 and 57 are connected to the terminal outlet connector 46.

The instrument is assembled by inserting the mass assembly 4 and the frame assembly, assembled with rings and coil means into the case and resting the entire assembly on the shoulder of the case on which 20 rests. The case is filled with a damping liquid, such as an electrically insulating, i.e., non-conductive, oil, siloxane oils such as sold as Silicone oils by Dow-Corning Chemical Company. Before inserting the unit into the system, the resistance 50 and resistances 54 and 55 are determined to provide a zero output at 56 and 57 upon the application of a design A.C. voltage at 45 and 46.

The bridge circuit and transformers are fully contained inside the container and are balanced and do not require external leads to balancing resistances and inductances. This avoids variations in reactance resulting from movement of leads.

The value of the resistance 50 or 50′ is established to compensate for the quadrature unbalance of the secondaries 47, 48 and coils 33 and 41 in the bridge. An inductive bridge such as is composed of the inductances 47, 48, 33 and 41 is most difficult to balance unless the impedances be balanced both reactively and resistively; otherwise, the output may be out of phase with the input to the bridge. In order to avoid this result, symmetry is necessary. In the absence of such symmetry any inequality in capacitance and inductance in the legs of the bridge will introduce a shift in the phase relationship in the various legs of the bridge and an overall phase displacement at the output with respect to the input of the bridge. The circuit employed and shown in FIG. 4 avoids this difficulty. The inductances 33 and 41 are designed to balance as nearly as possible the inductances in the secondary circuit 47 and 48. The required resistance 50 is then determined experimentally to correct the quadrature unbalance of the bridge composed of 47, 48, 33 and 41. Normally, this would be sufficient to give a zero balance to the bridge. This balance is accomplished before installation of the coils in the unit.

When the coils are installed in the unit, the relationship of the coils 33 and 41 with respect to the mass may not produce a symmetrical arrangement of the coils and armature because of the variations in the spacers 38′ and the degree of clamping. The presence of such asymmetry will produce a net output of the bridge due to the inequality in the air gap between the coils and the armatures, which makes the reluctance in the magnetic circuit of each of the coils 33 and 41 unequal. Since this output is in phase with the input, due to the balancing of the main bridge, the vernier bridge B composed of secondaries 51 and 52 and the resistances 54 and 55, may be powered from the same power source as bridge A and therefore may be coupled inductively with the primary 44 and therefore powered thereby.

The input to vernier bridge is then in phase with the input to the main bridge A and also in phase with the output of the main bridge A. The consequence of this arrangement is that the vernier bridge will balance out the output from the main bridge resulting from mechanical imperfections in the mounting or adjustment, and may be thus powered from a common source.

After mounting the unit and before final assembly thereof, the magnitude of resistances 54 and 55 are determined and the proper resistances introduced into position in the receiver 31 and the unit is then assembled.

It is to be noted that the resistances 50, 50′, 54 and 55 may be made temperature sensitive to correct for variations of impedance in the legs of the bridges A and B resulting from any inequality in the temperature coefficient of the variation of inductance with temperature of the coils 33 and 41, or slight shifts in the zero position of the spring mass system due to residual mechanical strain in the mounting of the system.

When the resistance load, schematically indicated at 58, is placed across the output of the bridges, the ratio of the resistance to inductance of the main bridge A is changed as compared to zero load conditions. In order to keep the output of the main bridge in phase with the input to the primary, the ratio of the resistive to the reactive components of the impedance in the input circuit of the primary 44 is established to be substantially the same as in the bridge circuits with the load resistance in the circuit by adding a second resistance 59 in series with the primary 44.

An output of the bridge occurs when the mass 4 is displaced so as to cause one of the armatures to approach and the other to move away from its adjacent coil 33 or 41, as the case may be, resulting in a change in the impedance of the coils 33 and 41. This output may be measured by a read out device such as an oscillograph, illustrated in 61.

The force coils 22 and 23 are mounted with the poles so that the fields are opposed so that they add at the flanges 6 and 24, which thus act as radial pole rings, pass through 6 and 5, which thus act as radial pole ring members. The flux returns through sleeve 24' and radial pole rings 17 and 19 respectively. The coils 22 and 23 are electrically connected exteriorly of the unit, as shown in FIG. 5. The coils are each shunted by a variable resistor (see 62 and 63) and the potentiometer 65 may be adjusted. Thus by adjustment of 65, 63 and 62, a differential current measured by the ammeter A may pass through the coils. The radial ring 17 extends axially beyond the adjacent end of the radial pole ring 27, and the radial pole ring 19 extends axially beyond the end of the radial pole ring 28. The resultant magnetic force may thus be exerted to displace the mass 4, which thus acts as the solenoid armature, in a direction depending on the direction of the differential current and on its magnitude.

The flux density at 6a remains substantially constant irrespective of any displacement of the mass 4, which thus acts as the armature for the differential solenoid including coils 22 and 23 which are inductively coupled with the sleeve 5. On displacement of the mass 4, in one direction the gaps 6a remain constant, while the gaps 6b and 6c, while remaining of constant length, are of variable area and vary in opposite directions. The net flux through the coils 22 and 23 and the mass 4 thus remains substantially constant independent of movement of the mass.

Referring to FIG. 5, the variable resistances 62 and 63 are adjusted to compensate for incidental differences in the gap dimensions, winding and leakage flux, to establish a net zero magnetic force on the mass 5 when the mass is at its zero, that is its undisplaced position. The consequence of this arrangement is that no net force is exerted on the mass 5 by the coils 22' and 23' when they are energized in the circuit shown on FIG. 5. With the circuit balanced as shown in FIG. 5, zero current will be indicated by the ammeter. It will be observed that the system is designed so that it is symmetrical about a mid-plane between the two coils 22 and 23, so that when the instrument is placed horizontally with the gravitational vector, perpendicular to the sensitive axis, i.e. the case and system, no differential current is in the coil, no force is exerted on the mass 4 to displace the same. Any displacement from zero position would be indicated by an output at 56—57. The balance is checked by observing, as stated above, whether there is current flow through the ammeter A and an output at 56—57. The system is thus balanced inertially and magnetically.

If the instrument to be employed is in a vertical position, i.e. with the gravitational vector parallel to the sensitive axis of the instrument, the potentiometer 65 and the resistances 63 and 62 are adjusted to give a zero output at 56 and 57 at the bridge of FIG. 4 under this resultant gravitational acceleration. It will be noted that with the instrument vertical, the mass will be displaced downwardly due to gravitation and the coils 22 and 23 must be unbalanced to give a net contra-gravitational magnetic force equal to the force of acceleration due to gravity and thus reestablish the central position of the mass 4 between the coils 33 and 41 to give a zero output at 56—57. Where this is not desired, instead of employing the force coils to bring to a null balance, we may employ spacers 38' and 39' of unequal width to center the mass mechanically between the coils 33 and 41 under the influence of gravitational displacement. With either means for centering the mass against gravity, the mass is centrally positioned so that it is centered magnetically between the sensing coils 33 and 41 as described above, to give a zero output at 56—57.

By adjusting the potentiometer 65 to unbalance the coils 22 and 23, we may thus introduce a net magnetic force and measure the displacement of the mass by measuring the output at 56—57 as a result of this magnetic force. Since the mechanical force necessary to displace the mass is known and its variation with displacement also known, the mechanical force resulting from an unbalance of the bridge of FIG. 5, as shown by the reading of the ammeter A, is also known.

It will be observed that if the mass is displaced upwardly against gravity, the force necessary to give a unit displacement of the mass is greater than if the mass is displaced downwardly due to the fact that the gravitational vector is subtractive when the mass is moved upward and additive when the mass is moved downward.

In order to equalize and make linear the displacement of the mass irrespective of whether the mass moves upwardly or downwardly, i.e. with or against the gravitational vector and thus the reading on the ammeter A of FIG. 4 be a correct measurement of displacement irrespective of direction, the gaps 6a, 6b and 6c are made different. Thus the gap 6b in length is made smaller than the gap 6c and the gaps contoured so that the average gap length of 6b increases as the mass moves downward in the direction of the gravitational vector. This may be done by tapering downwardly the external surface of the gap 6c. What is desired is that the differential current for unit displacement of the mass upwardly be substantially equal to the differential current required for unit displacement downwardly. This is obtained in our system of this application in which a linear axial solenoid is provided in which the force on the armature is directly proportional to the differential current. The contouring of the gaps is designed to obtain magnet stiffness, such that when added to the mechanical spring acting on the inertial mass, will produce a net force displacement relationship which will be linear and independent of the direction of motion.

In order to avoid the interaction of the magnetic fields of the coils 33 and 41 with the magnetic field of the solenoid coils 22 and 23, which otherwise would introduce greater complications in design, we provide for the substantial isolation of these two fields. This isolation results from the low-magnetic permeability characteristics of the springs 7 and 8, the oxidized surfaces of the laminated armature 10 and 12, the flanges 10' and 12', the spacers 38' and 39', and rings 18 and 20, all of low permeability as described above. Furthermore, by making the face of 27 and 28 large in area while the gap 6b and 6c are made small in length, a low flux density is obtained in the small length gap and the leakage flux is thus substantially reduced to very small values.

The polarities of the A.C. fields of the coils 33 and 41 are made to vary in phase so that any residual leakage field will affect the A.C. permeability of the magnetic circuit of the coils 33 and 41 identically. The A.C. field is made from about 10 to 100 times the mechanical natural frequency of the suspended mass 4 so that the coils 33 and 41 see at any instant of time a sensibly constant mass position with respect to each coil, which will be irrespective of the oscillation of the mass.

As a consequence, the null position of the system will not be influenced in any material respect by the magnetic leakage fields from the force coils. The displacement of the mass occurring in use is small, so that the variation in reluctance of the magnetic circuit associated with the force coil is of the order of ⅓ or less, e.g. 15–20% of the total reluctance in all the gaps including the gap 6a.

FIG. 6 shows a modification of the mass assembly employed in the unit, whereby an eddy current damping force may be introduced into the system. Where the system in FIGS. 1–5 is filled with damping fluid, such as a silicone oil, the damping force may be the result of shear forces attained by relative movement of the mass in the gaps and also by the relative movement of the liquid in the passageways 30. We may, in addition to using liquid as a damping force or in the place of using liquid, employ an electromagnetic damping force by replacing the plastic of rings 25 and 26 by electrically conductive material such as copper or aluminum, or other metal used in eddy current brakes (metal rings 26a and 25a) and by connecting the coils 23 and 22 so that the currents and the resultant mechanical force of the coils buck each other and cancel each other out. The current flowing in the coils will induce eddy currents in the copper rings and introduce a magnetic force which will oppose the motion of the mass caused by the oscillation of the mass. Due to the nature of the eddy currents, the magnitude of these currents and the braking action resulting from the electromagnetic forces thus developed are proportional to velocity and therefore have the effect of a damping force.

By controlling the magnitude of the current through the coils 22 and 23, we may control the magnitude of this damping force and therefore obtain any desired degree of damping.

While we have described a particular embodiment of our invention for the purpose of illustration, it should be understood that various modifications and adaptations thereof may be made within the spirit of the invention as set forth in the appended claims.

We claim:

1. An electromagnetic transducer, including a mass, a spring suspension for said mass, a pair of armatures connected to said mass, a pair of coils, one coil positioned adjacent each armature, a core for each coil, said armatures being spaced from said core to form an air gap between each armature and its adjacent core, said mass being magnetically permeable and of low coercive force, a plurality of radial pole rings mounted on said mass in longitudinally spaced position, to provide a pair of end pole members and an intermediate pole member, a plurality of complementary radial pole rings positioned one at each of said end pole members, and a complementary intermediate pole ring, said complementary pole ring members being spaced from said first-mentioned pole members to form a pair of end gaps and an intermediate gap, a pair of spaced coils surrounding said mass and magnetically coupled with said mass and said gaps and positioned between said intermediate gap and said end gaps, whereby on energizing of said coils, a pair of magnetic fields are formed which add at said said intermediate gap, and means to sense the displacement of said mass said last-named means including said armatures and the coils positioned adjacent to said armatures.

2. In combination with the transducer of claim 1, an electrical bridge including each of said first mentioned coils, means to impose a potential across each of said coils, a means to measure the output of said bridge on displacement of said mass.

3. In the combination of claim 2, said bridge including said coils positioned adjacent to said armatures and connected in series and a pair of balancing coils connected in series, a resistance connected to each of said balancing coils and to said coils positioned adjacent to said armatures, a primary coil inductively coupled with said balancing coils, a center tap between said coils positioned adjacent to said armatures, a second center tap between said balancing coils and connected to an output terminal for said bridge, a second bridge comprising two coils in series inductively coupled with said primary, the center tap between said coils of said second bridge electrically connected to the first mentioned center tap, a pair of balancing resistances connected in series and connected to said coils of said second bridge, a center tap connected between said resistances and connected to another output terminal of said bridge.

4. In the transducer of claim 1, said complementary radial end pole rings having a length extending axially beyond said first mentioned end pole rings, whereby on axial displacement of said mass the average gap length of one of said end gaps increases while the average length of the other of said end gaps decreases.

5. In combination with the transducer of claim 4, an electrical bridge including each of said first mentioned coils, means to impose a potential across each of said coils, a means to measure the output of said bridge on displacement of said mass.

6. In combination with the transducer of claim 5, said bridge including said coils positioned adjacent to said armatures and connected in series and a pair of balancing coils connected in series, a resistance connected to each of said balancing coils and to said coils positioned adjacent to said armatures, a primary coil inductively coupled with said balancing coils, a center tap between said coils positioned adjacent to said armatures, a second center tap between said balancing coils and connected to an output terminal for said bridge, a second bridge comprising two coils in series inductively coupled with said primary, the center tap between said coils of said second bridge electrically connected to the first mentioned center tap, a pair of balancing resistances connected in series and connected to said coils of said second bridge, a center tap connected between said resistances and connected to another output terminal of said bridge.

7. An electromagnetic transducer comprising a mass, a case, said mass positioned in said case, a pair of plate springs mounted on said mass, one at each end of said mass, and extending towards said case, means to clamp said springs to said mass and to said case, said springs and said clamping means being of low magnetic permeability and said mass being of high magnetic permeability and low coercive force, a flat armature positioned one at each end of said mass and extending across said case, said springs being positioned between said mass and said armatures, a pair of solenoid coils surrounding said mass and positioned in said case between said springs, and additional coils positioned in said case, one at each end of said case, a core for each of said additional coils, one of said armatures being spaced from one of said cores and the other of said armatures being spaced from the other of said cores, whereby the magnetic fields of said last-named coils are magnetically separated from the magnetic fields of said solenoid coils.

8. In combination with the transducer of claim 7, an electrical bridge including each of said additional coils, means to impose a potential across each of said solenoid coils, and means to measure the output of said bridge on displacement of said mass said means including said additional coils and said armatures.

9. In the combination of claim 8, said bridge including said coils positioned adjacent to said armatures and connected in series and a pair of balancing coils connected in series, a resistance connected to each of said balancing coils and to said coils positioned adjacent to said armatures, a primary coil inductively coupled with said balancing coils, a center tap between said coils positioned adjacent to said armature, a second center tap between said balancing coils and connected to an output terminal for said bridge, a second bridge comprising two coils in series inductively coupled with said primary, the center tap between said coils of said second bridge electrically connected to the first mentioned center tap, a pair of balancing resistances connected in series and connected to said coils of said second bridge, a center tap connected between said resistances and connected to another output terminal of said bridge.

10. In the transducer of claim 7, said mass being magnetically permeable and of low coercive force, a plurality of radial pole rings mounted on said mass in longitudinally spaced position, to provide a pair of end pole members and an intermediate pole member, a plurality of complementary radial pole rings positioned one at each of said end pole members, and a complementary intermediate pole ring, said complementary pole ring members being spaced from said first-mentioned pole members to form a pair of end gaps and an intermediate gap, a pair of spaced solenoid coils surrounding said mass and magnetically coupled with said mass and said gaps and positioned between said intermediate gap and said end gaps, whereby on energizing of said coils, a pair of magnetic fields are formed which add at said intermediate gap, and means to sense the displacement of said mass said means including said additional coils and said armatures.

11. In combination with the transducer of claim 10, an electrical bridge including each of said additional coils, means to impose a potential across each of said solenoid coils, and means to measure the output of said bridge on displacement of said mass said means including said additional coils and said armatures.

12. In combination with the transducer of claim 10, said bridge including said coils positioned adjacent to said armatures and connected in series and a pair of balancing coils connected in series, a resistance connected to each of said balancing coils and to said coils positioned adjacent to said armatures, a primary coil inductively coupled with said balancing coils, a center tap between said coils positioned adjacent to said armature, a second center tap between said balancing coils and connected to an output terminal for said bridge, a second bridge comprising two coils in series inductively coupled with said primary, the center tap between said coils of said second bridge electrically connected to the first mentioned center tap, a pair of balancing resistances connected in series and connected to said coils of said second bridge, a center tap connected between said resistances and connected to another output terminal of said bridge.

References Cited in the file of this patent
UNITED STATES PATENTS

| | | |
|---|---|---|
| 2,210,970 | Bonell | Aug. 13, 1940 |
| 2,509,621 | Willoughby | May 30, 1950 |
| 2,744,335 | Litman | May 8, 1956 |
| 2,767,973 | Ter Veen et al. | Oct. 23, 1956 |
| 2,856,240 | Breazeale et al. | Oct. 14, 1958 |
| 2,888,256 | Sedgfield | May 26, 1959 |
| 2,923,904 | Hieber | Feb. 2, 1960 |